Nov. 4, 1930.  J. D. HOUCK  1,780,751
COFFEE MAKING DEVICE
Filed Dec. 8, 1928
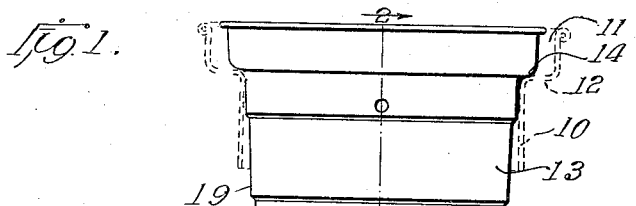
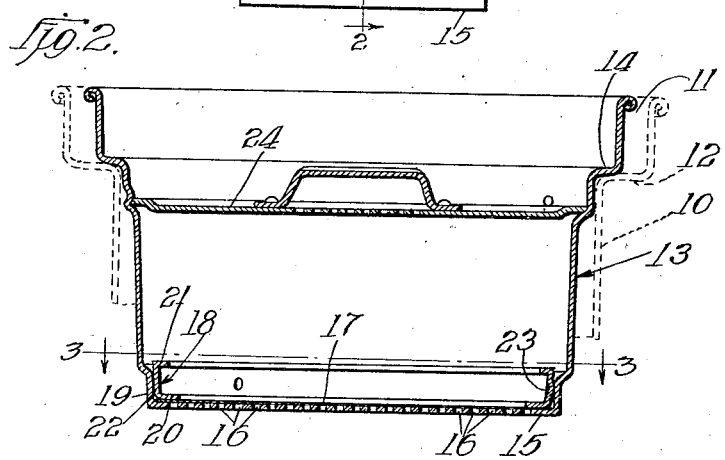
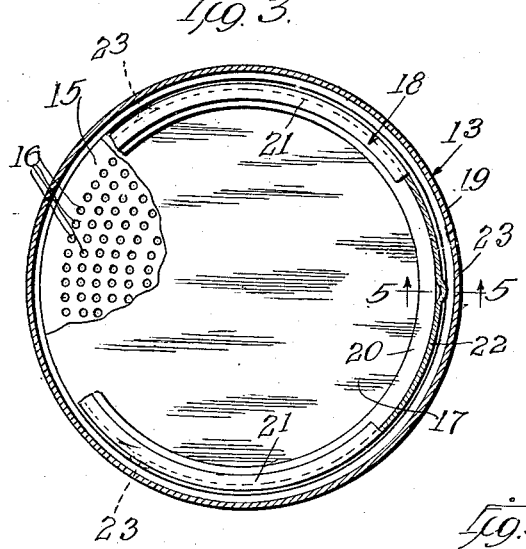
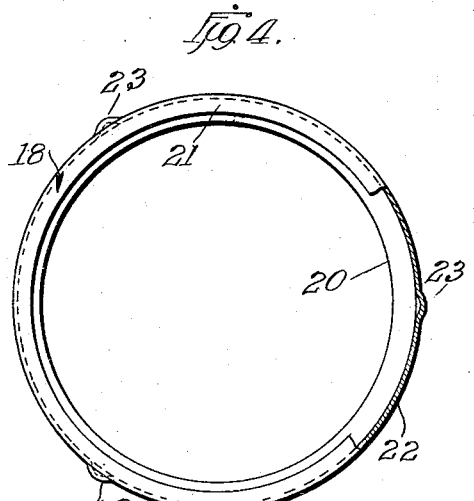
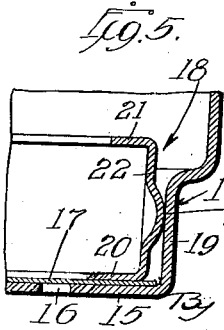
Witness:
Harry R. L. White
Inventor:
John D. Houck.
Edward Fay Wilson
Atty.

Patented Nov. 4, 1930

1,780,751

UNITED STATES PATENT OFFICE

JOHN D. HOUCK, OF CHICAGO, ILLINOIS

COFFEE-MAKING DEVICE

Application filed December 8, 1928. Serial No. 324,648.

This invention relates to improvements in coffee making devices and has special reference to improvements in such devices in which the ground coffee is supported in the upper part of a vessel, pot or urn and the hot water is percolated through the ground coffee.

The particular object of this invention is to provide readily removable means for holding a filter sheet, especially a paper filter sheet on a perforated support for the ground coffee.

The filter sheet is used to prevent the ground coffee passing through the perforated support and it has been found that if this sheet lies loose on the perforated support, it is frequently displaced in placing the support with the ground coffee in position in an urn. With the aid of this present invention such displacement is prevented with the result that when the coffee is made there is no possibility of any grounds having fallen through into the bottom of the vessel, that is, into the coffee beverage.

Other objects, purposes and features will become apparent from the following description and the appended claims taken in conjunction with the accompanying drawings forming part of this specification and in which:—

Fig. 1 is a side elevation of a ground coffee holding vessel embodying this invention and shown as adapted for use in the top of a coffee making urn;

Fig. 2 is a central, vertical section on the line 2—2 of Fig. 1;

Fig. 3 is a fragmentary plan section taken on the line 3—3 of Fig. 2;

Fig. 4 is a similar plan view, partly in horizontal section of the filter sheet holding ring; and Fig. 5 is an enlarged fragmentary vertical section on the line 5—5 of Fig. 3.

In said drawings, 10 represents a coffee-making urn having an open top 11, and provided with an internal, circumferential shoulder 12 near its top upon which to support a vessel 13 for containing ground coffee.

The vessel 13 has an external circumferential shoulder 14 which is adapted to rest upon the shoulder 12 for supporting the vessel 13 in the upper part of the urn 10.

The body of the vessel 13 extends down in the urn and it is provided with a perforated bottom 15 which is adapted to support the ground coffee in the vessel 13. The openings 16 in the perforated bottom are relatively large and unless prevented would permit the ground coffee to fall through into the urn. To prevent this a sheet 17 of filtering material such as paper is laid on the perforated bottom 15. It is common practice to use a sheet of filtering paper of the same diameter as the bottom 15; this is to prevent the wrinkling of the paper sheet.

It has been found, when this is done and the ground coffee is placed on the filter sheet, that the ground coffee frequently gets beneath the filter sheet, especially when lifting the vessel 13 to an elevation necessary for placing it on the top of an urn 10, particularly a large or high urn in a restaurant.

To prevent this undesired possibility, I have provided a friction held metal ring 18, very light in cross-section and consequently very light in weight for holding the paper sheet 17 in place. This ring 18 preferably consists of an endless ring of channel shape in cross-section and adapted to fit snugly within the lower end 19 of the vessel 13.

The lower end 19 is preferably of reduced diameter and this smaller diameter portion is preferably of less height than the ring 18. The ring 18 has a lower internal flange 20, an upper similar flange 21 connected at their outer edges with a vertical web 22. The ring is made slightly smaller in diameter than the portion 19 of the vessel 13 within which it is received.

To cause the ring 19 to be frictionally held in position and be capable of being readily removed, when desired, the ring is provided with several, preferably three, bumped-out projections 23 which are adapted to frictionally engage the inner surface of the portion 19 of the vessel 13 as best shown in Fig. 5. These projections 23 are formed about the middle of the height of the wall 22 thus making the two end portions of the ring 18 into nozzles which no matter which one is turned down enters freely within the lower reduced end 19 of the vessel 13.

The ring having been entered, it is easily pushed down into place the walls yielding sufficiently to permit the ring to be easily pushed down so that its lower flange seats firmly upon the outer edge portion of the filter sheet 17. The upper flange not only provides a convenient surface upon which to push in placing the ring in holding position, but also provides a convenient finger-hold for pulling the ring out when it is desired to release the filter sheet. The lower flange 20 is made of a suitable width to properly clamp the filter sheet and the upper flange 21 is made of a suitable width to serve its purpose but as these flanges are substantially the same width, it will operate properly even if inadvertently reversed in position.

In using the ring 18, the filter sheet, preferably a prepared paper disk, is placed in the vessel 13 on the perforated bottom 15 and then the ring 18 is pushed down firmly upon the filter sheet, the frictional engagement of the ring with the side wall of the vessel retaining it firmly in position. Then the ground coffee is placed in the vessel on the filter sheet.

As shown, the vessel is provided with a perforated plate or horizontal partition 24 above the space occupied by the ground coffee. This plate 24 is perforated and in making coffee hot water is poured into the vessel upon the plate 24. The plate 24 spreads the water and causes it to fall upon the ground coffee substantially throughout its area in the most effective manner for quickly extracting all of the coffee essence.

As many modifications of the invention will readily suggest themselves to one skilled in the art I do not limit or confine the invention to the specific details of construction herein shown and described.

I claim:

1. In a device of the character described and having a container provided with a perforate bottom, the marginal portion of the bottom being imperforate, the bottom adapted to receive a filter sheet, the marginal edge of which rests upon said imperforate margin, and a filter sheet holding ring having internal flanges at its top and bottom, the bottom flange adapted to clamp the marginal edge of a filter sheet upon the imperforate marginal edge portion of the bottom, said ring adapted to frictionally engage the side wall of the container adjacent to the bottom and the upper flange serving as a finger hold for removing the ring.

2. In a device of the character described and having a container provided with a perforate bottom, the marginal portion of the bottom being imperforate, the bottom adapted to receive a filter sheet, the marginal edge of which rests upon said imperforate margin, and a filter sheet holding ring having internal flanges at its top and bottom, the bottom flange adapted to clamp the marginal edge of a filter sheet upon the imperforate marginal edge portion of the bottom and the top flange providing a finger hold for lifting the ring, and pressed out projections on the web portion of the ring adapted to frictionally engage the wall of the container adjacent to the bottom and hold the ring in position, clamped upon the marginal edge of the filter sheet.

In witness that I claim the foregoing as my invention, I affix my signature this 10th day of October, A. D. 1928.

JOHN D. HOUCK.